(12) United States Patent
Wakui et al.

(10) Patent No.: US 6,336,884 B1
(45) Date of Patent: Jan. 8, 2002

(54) BELT FOR CONTINUOUSLY VARIABLE TRANSMISSION

(75) Inventors: Hiroshi Wakui; Shigeru Kanehara, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/509,824
(22) PCT Filed: Mar. 9, 1999
(86) PCT No.: PCT/JP99/01135
§ 371 Date: Apr. 20, 2000
§ 102(e) Date: Apr. 20, 2000
(87) PCT Pub. No.: WO09/50982
PCT Pub. Date: Mar. 9, 1999

(30) Foreign Application Priority Data

Aug. 28, 1998 (JP) .......................................... 10-242720

(51) Int. Cl.⁷ ................................................. F16G 1/22
(52) U.S. Cl. ......................... 474/245; 474/201; 474/242
(58) Field of Search ............................... 474/240–245, 474/265, 237, 201

(56) References Cited

U.S. PATENT DOCUMENTS 4,826,473 A  *  5/1989  Miyawaki ................... 474/240
5,427,579 A  *  6/1995  Kanehara et al. ............. 474/28

FOREIGN PATENT DOCUMENTS

| JP | 62-133040 | 8/1987 |
| JP | 6-10993 | 1/1994 |

* cited by examiner

Primary Examiner—David A. Bucci
Assistant Examiner—Vicky A. Johnson
(74) Attorney, Agent, or Firm—Arent Fox Kintner Plotkin & Kahn, PLLC

(57) ABSTRACT

When a tangential friction force received by a pulley abutment surface 37 of a metal element 32 from a pulley is represented by FV; a radial distance from a point 45 of action of the tangential friction force to a rocking edge 40 located radially outside the friction force-acting point 45 is represented by L; a radially inward load received by the metal element 32 from a metal ring assembly 31 is represented by FL; and a thickness of the metal element 32 is represented by t, the radial distance L and the thickness t of the metal element are determined, so that a relation, $L/t \leq FL/2FV$ is established. Thus, even if a moment $FV \times L$ is applied to the metal element 32 by the tangential friction force FV, the moment $FV \times L$ can be canceled by a moment $FL \times (t/2)$ generated by a load FL for urging an edge a of a ring slot 35 by the metal ring assembly 31, thereby preventing the inclination of the metal element 32 to enhance the durability of the metal ring assembly.

1 Claim, 6 Drawing Sheets

TANGENTIAL FRICTION FORCE

TANGENTIAL FRICTION FORCE FV

URGING FORCE E ACTING BETWEEN METAL ELEMENTS

BELT FOR CONTINUOUSLY VARIABLE TRANSMISSION

FIELD OF THE INVENTION

The present invention relates to a belt for a continuously variable transmission comprising a large number of metal elements supported on metal ring assemblies each of which is comprised of a plurality of endless metal rings laminated one on another.

BACKGROUND ART

As shown in FIG. 3, if a metal element 32 supported with each of ring slots 35 thereof fitted over a metal ring assembly 31 is inclined with respect to the metal ring assembly 31, edges a and b of the ring slot 35 abut against an inner periphery of the metal ring assembly 31. For this reason, there is a problem that a large stress is produced in such abutment portion to exert an adverse influence to the durability of the metal ring assembly 31. The inclination (pitching) of the metal element 32 is caused when a friction force by an urging force acting between the metal elements cannot resist against an angular moment by a tangential friction force received by the metal element 32 on its surface in contact with a pulley. This tendency is particularly significant in an outlet portion of a driven pulley. The reason will be described below.

It is known that as shown in FIG. 4A, the tangential friction force FV received by the metal element 32 (see FIG. 3) from a drive pulley 6 or a driven pulley 11 is larger in the outlet portion of the pulley 6 or 11, and the value of the friction force FV reaches four times a value generated when the tangential friction force FV is averagely distributed over the entire area of the pulley 6 or 11 around which the metal element is wound, for the reason that the pulley 6 or 11 is deformed to cause a concentration of the axial thrust. As can be seen from FIG. 3, the tangential friction force FV acts on the metal element 32 so as to fall the metal element 32 in a counterclockwise direction about the center 44 of swinging movement.

Furthermore, as shown in FIG. 4B, the urging force E acting between the metal elements 32 to inhibit the inclination of the metal elements 32 has a large value in the outlet portion of the drive pulley 6, but is 0 (zero) in the outlet portion of the driven pulley 11. As can be seen from FIG. 3, radial friction forces $E_1$ are applied to front and rear surfaces of the metal element 32 by the urging force E so as to fall the metal element 32 in a clockwise direction about the center 44 of swinging movement, namely, to oppose a counterclockwise moment generated by the tangential friction force FV. Therefore, the metal element 32 is liable to be inclined to the largest extent in a position in which the tangential friction force FV acting the metal element 32 to incline the metal element 32 is the maximum and the urging force E inhibiting the inclination of the metal element 32 is 0 (zero), i.e., in the outlet portion of the driven pulley 11.

A belt for a continuously variable transmission has been proposed in Japanese Patent Application Laid-open No.6-10993, in which a projection is formed on a saddle surface of a ring slot in a metal element (on a face against which an inner periphery of a metal ring assembly abuts), the projection being offset forwards in a direction of movement of the metal element from a thickness-wise central portion of the metal element, so that a moment generated by the tangential friction force is countervailed by a load for urging the projection by the metal ring assembly, thereby to prevent the inclination of the metal element.

However, if the projection is formed on the saddle surface of the ring slot in the metal element, it is difficult to form the metal element only by pressing. This causes not only a problem that it is necessary to carry out the machining or cutting after the pressing to bring about an increase in processing cost, but also a problem that a local compressive stress is generated in the inner periphery of the metal ring assembly abutting against the projection on the saddle surface, this causing the amplitude of a stress inside the innermost metal ring to increase to thereby reduce the durability. Further, in the art disclosed in Japanese Patent Application Laid-open No.6-10993, it is difficult to effectively prevent a moment acting so as to fall the metal element in the advancing direction.

DISCLOSURE OF THE INVENTION

The present invention has been accomplished with the above circumstances in view, and it is an object of the present invention to ensure that the inclination of the metal element is prevented without increasing the processing cost of the metal element to enhance the durability of the metal ring assembly.

To achieve the above object, according to the present invention, there is provided a belt for a continuously variable transmission, comprising metal ring assemblies each of which is comprised of a plurality of endless metal rings laminated one on another, and a large number of metal elements supported along the metal ring assemblies, the belt being wound around a drive pulley and a driven pulley to transmit a driving force, the metal element comprising ring slots into which the metal ring assemblies are fitted, pulley abutment surfaces provided radially inside the ring slots to abut against the drive pulley and the driven pulley, a rocking edge which is provided at a radially inner end of a main surface for transmitting an urging force between said metal elements, and which serves as a fulcrum for the pitching of the metal elements, characterized in that a relation, $L/t \leq FL/2FV$ is established, wherein FV represents a tangential friction force received by the pulley abutment surface from the drive pulley and the driven pulley; L represents a radial distance from a point of action of the tangential friction force to the rocking edge located radially outside the friction force-acting point; FL represents a radially inward load received by the metal element from the metal ring assemblies; and t represents a thickness of the metal element.

With the above arrangement, when the tangential friction force received by the pulley abutment surface from the drive pulley and the driven pulley is represented by FV; the radial distance from the point of action of the tangential friction force to the rocking edge located radially outside the friction force-acting point is represented by L; the radially inward load received by the metal element from the metal ring assembly is represented by FL; and the thickness of the metal element is represented by t, the relation, $L/t \leq FL/2FV$ is established. Therefore, even if a moment is produced to fall the metal element forwards by the backward tangential friction force acting on the pulley abutment surface of the metal element in the outlet of the driven pulley, a load for urging the rear edge of the ring slot radially inwards by the metal ring assembly cancels the moment to prevent the inclination of the metal element. As a result, the angle formed by the metal ring assembly and the ring slot of the metal element is maintained at a right angle and hence, it is possible to prevent a local load from being applied to the inner periphery of the metal ring assembly by the edge of the ring slot and to inhibit the increase in amplitude of a stress inside the innermost metal ring, thereby enhancing the durability of the metal ring assembly. Moreover, the pulley abutment surface of the metal element can be accurately brought into surface contact with the pulley to avoid the generation of an abnormal wearing. Further, the outer periphery of the metal ring assembly is prevented from interfering with the metal element and hence, it is possible to inhibit the increase in amplitude of the stress in the outermost metal ring and to prevent the local load inside the innermost metal ring from being increased by a reaction force from the interference. In addition, it is unnecessary to provide a special shape in a thickness-wise direction to the saddle surface of the ring slot in the metal element, against which the metal ring belt assembly abuts and hence, there is not a possibility that the processing cost for the metal element may be increased.

BRIEF DESCRIPTION OF THE DRAWINGS

FIGS. 1 to 7B show embodiments of the present invention. FIG. 1 is a skeleton illustration of a power transmitting system of a vehicle having a continuously variable transmission mounted thereon; FIG. 2 is a partial perspective view of a metal belt; FIG. 3 is an enlarged view taken in the direction of an arrow 3 in FIG. 2; FIG. 5 is a graph showing a region in which the inclination of the metal element is not produced; FIGS. 7A and 7B are diagrams showing the shape of the metal element according to the other embodiment of the present invention.

BEST MODE FOR CARRYING OUT THE INVENTION

The embodiments of the present invention will now be described with reference to the accompanying drawings.

Figure 1:
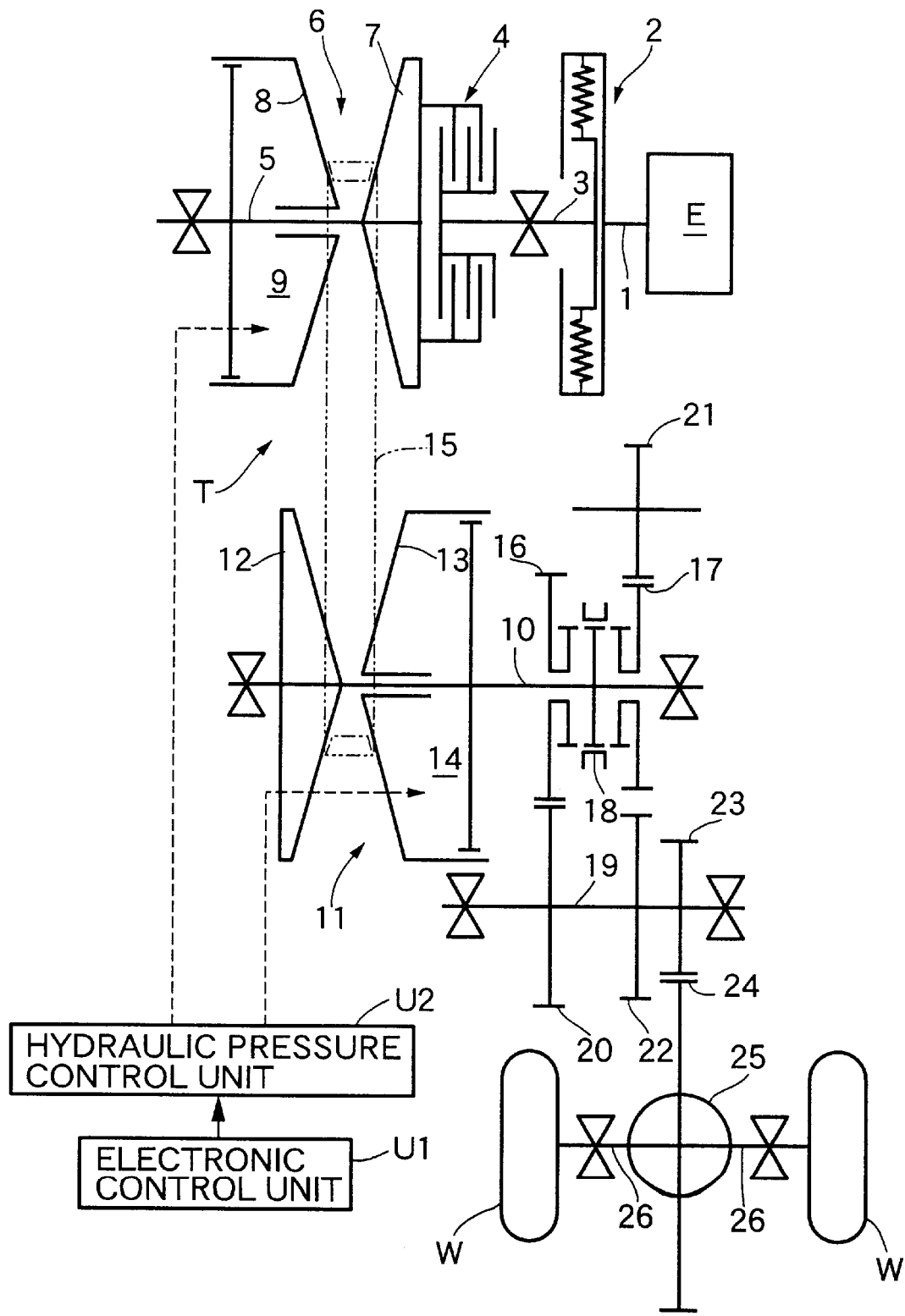

FIG. 1 shows the skeleton structure of a metal belt-type continuously variable transmission T mounted on an automobile. An input shaft 3 is connected to a crankshaft 1 of an engine E through a damper 2 and also connected to a drive shaft 5 of the metal belt-type continuously variable transmission T through a starting clutch 4. A drive pulley 6 is mounted on the drive shaft 5 and includes a stationary pulley half 7 secured to the drive shaft 5, and a movable pulley half 8 which is movable toward and away from the stationary pulley half 7. The movable pulley half 8 is biased toward the stationary pulley half 7 by a hydraulic pressure applied to an oil chamber 9.

A driven pulley 11 mounted on a driven shaft 10 disposed in parallel to the drive shaft 5 includes a stationary pulley half 12 secured to the driven shaft 10, and a movable pulley half 13 which is movable toward and away from the stationary pulley half 12. The movable pulley half 13 is biased toward the stationary pulley half 12 by a hydraulic pressure applied to an oil chamber 14. A metal belt 15 (see FIG. 2) comprising a large number of metal elements 32 supported on a pair of left and right metal ring assemblies 31, 31 is wound around the drive pulley 6 and the driven pulley 11. Each of the metal ring assemblies 31 comprises twelve metal rings 33 laminated one on another.

A forward drive gear 16 and a backward drive gear 17 are rotatably carried on the driven shaft 10 and are capable of being selectively coupled to the driven shaft 10 by a selector 18. Secured to an output shaft 19 disposed in parallel to the driven shaft 10 are a forward driven gear 20 meshed with the forward drive gear 16, and a backward driven gear 22 meshed with the backward drive gear 17 through a backward idle gear 21.

The rotation of the output shaft 19 is inputted to a differential 25 through a final drive gear 23 and a final driven gear 24 and then transmitted from the differential 25 through left and right axles 26, 26 to driven wheels W, W.

A driving force from the engine E is transmitted through the crankshaft 1, the damper 2, the input shaft 3, the starting clutch 4, the drive shaft 5, the drive pulley 6, the metal belt 15 and the driven pulley 11 to the driven shaft 10. When a forward travel range is selected, the driving force of the driven shaft 10 is transmitted through the forward drive gear 16 and the forward driven gear 20 to the output shaft 19 to move the vehicle forwards. When a backward travel range is selected, the driving force of the driven shaft 10 is transmitted through the backward drive gear 17, the backward idle gear 21 and the backward driven gear 22 to the output shaft 19 to move the vehicle backwards.

During this time, the shift ratio of the metal belt-type continuously variable transmission T is continuously regulated by controlling the hydraulic pressures applied to the oil chamber 9 in the drive pulley 6 and the oil chamber 14 in the driven pulley 11 of the transmission T by a hydraulic pressure control unit $U_2$ which is operated by a command from an electronic control unit $U_1$. More specifically, if the hydraulic pressure applied to the oil chamber 14 in the driven pulley 11 is increased relative to the hydraulic pressure applied to the oil chamber 9 in the drive pulley 6, a groove width of the driven pulley 11 is decreased, leading to an increased effective radius. Attendant on this, a groove width of the drive pulley 6 is increased, leading to a decreased effective radius. Therefore, the shift ratio of the metal belt-type continuously variable transmission T is varied continuously toward "LOW". Reversely, if the hydraulic pressure applied to the oil chamber 9 in the drive pulley 6 is increased relative to the hydraulic pressure applied to the oil chamber 14 in the driven pulley 11, the groove width of the drive pulley 6 is decreased, leading to an increased effective radius. Attendant on this, the groove width of the driven pulley 11 is increased, leading to a decreased effective radius. Therefore, the shift ratio of the metal belt-type continuously variable transmission T is varied continuously toward "OD".

Figure 2:
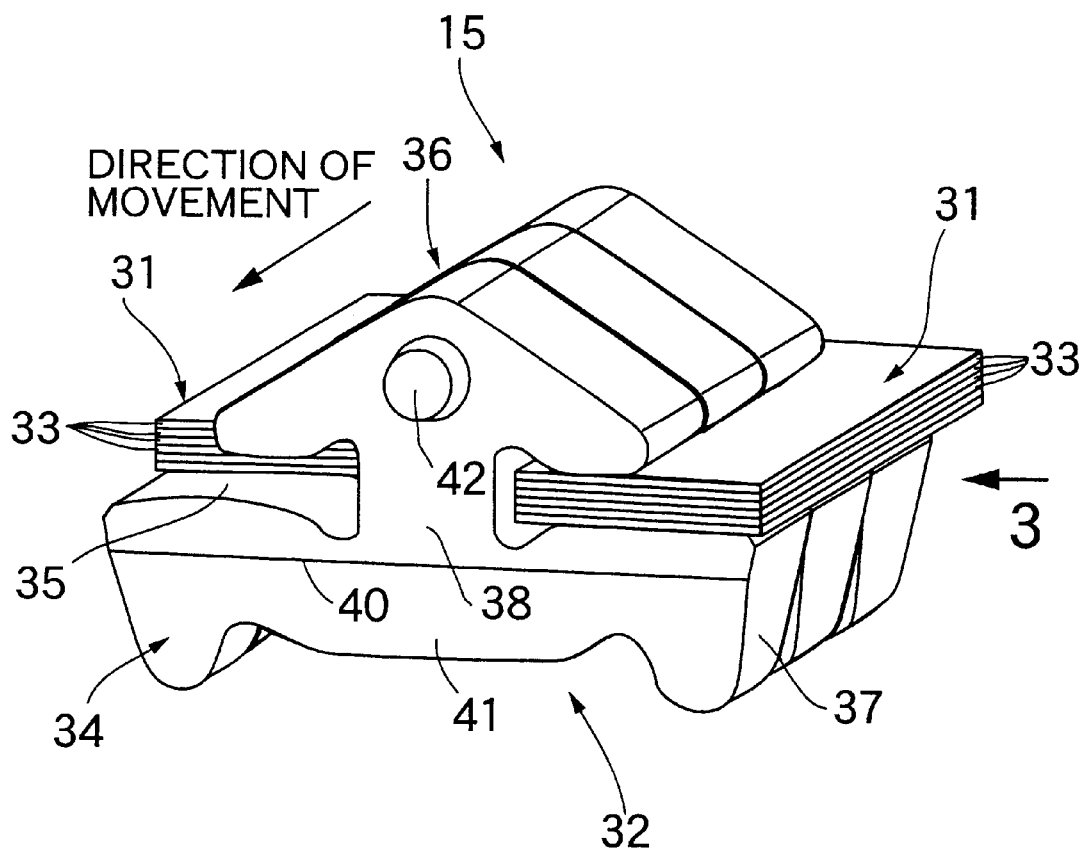
Figure 3:
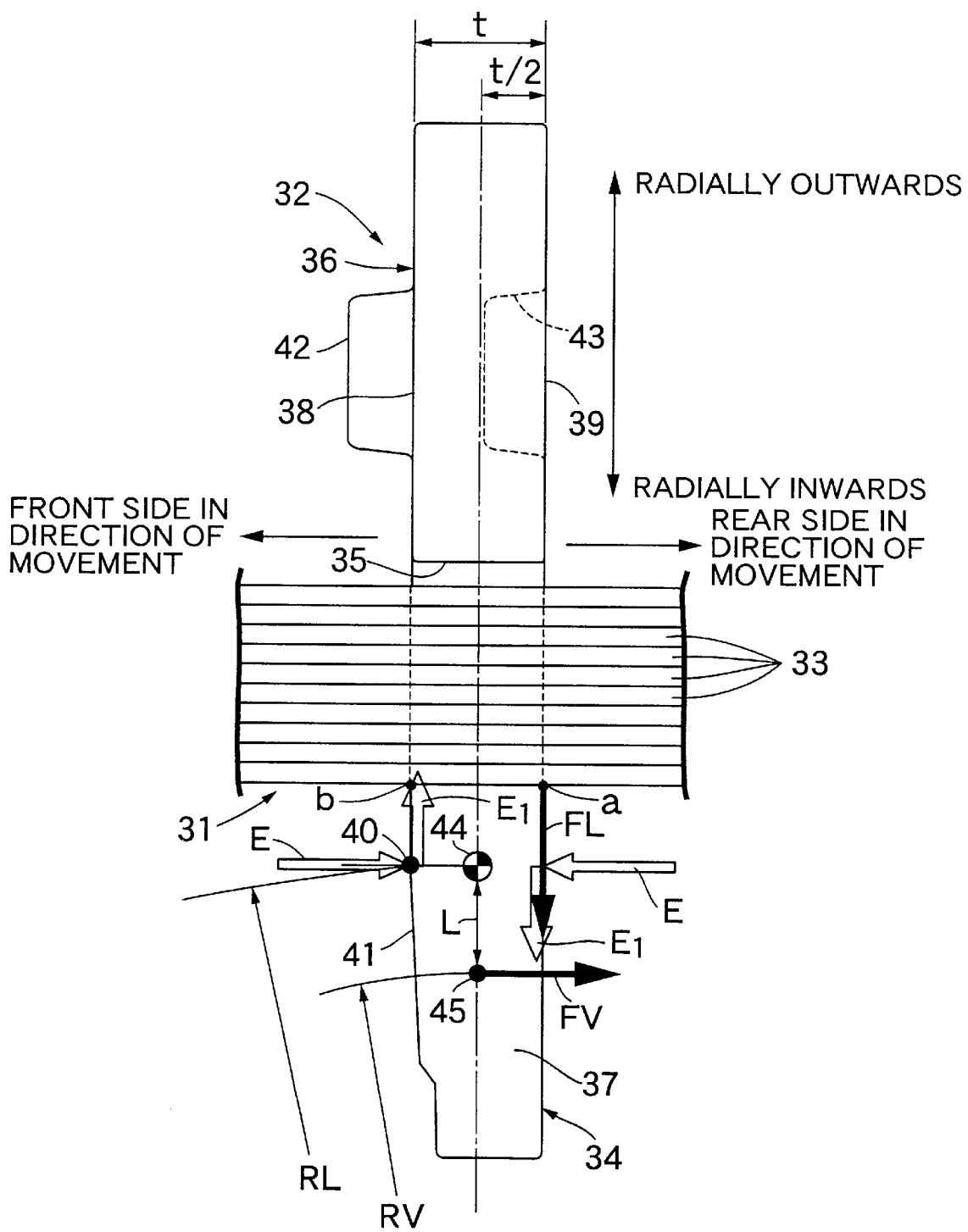
Figure 4A:
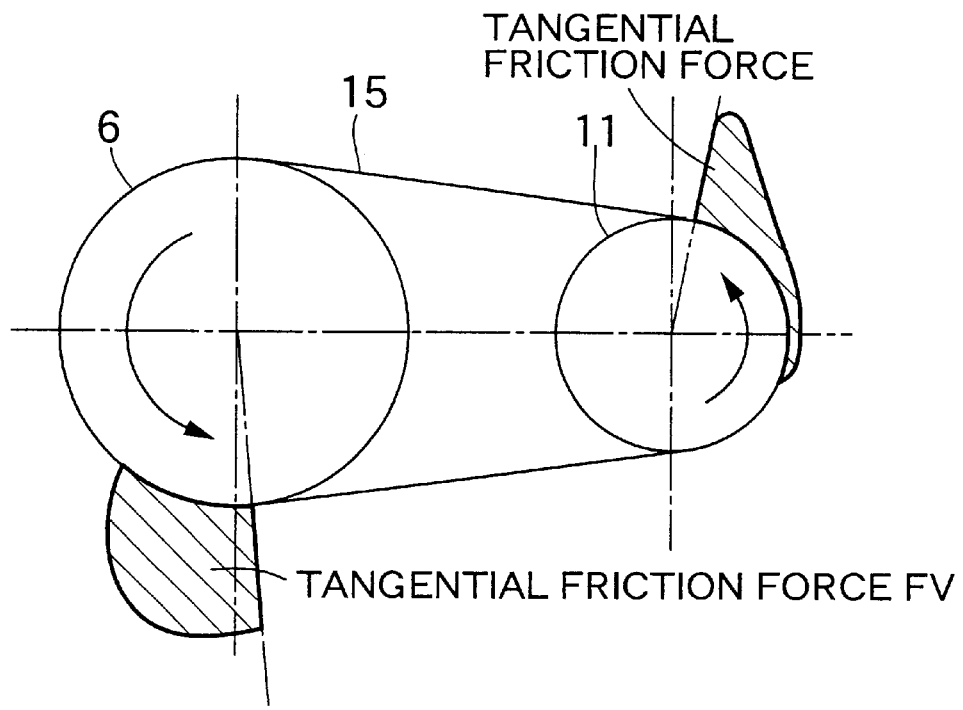
FIG. 4A is a diagram showing the distribution of a tangential friction force on a metal element.
Figure 4B:
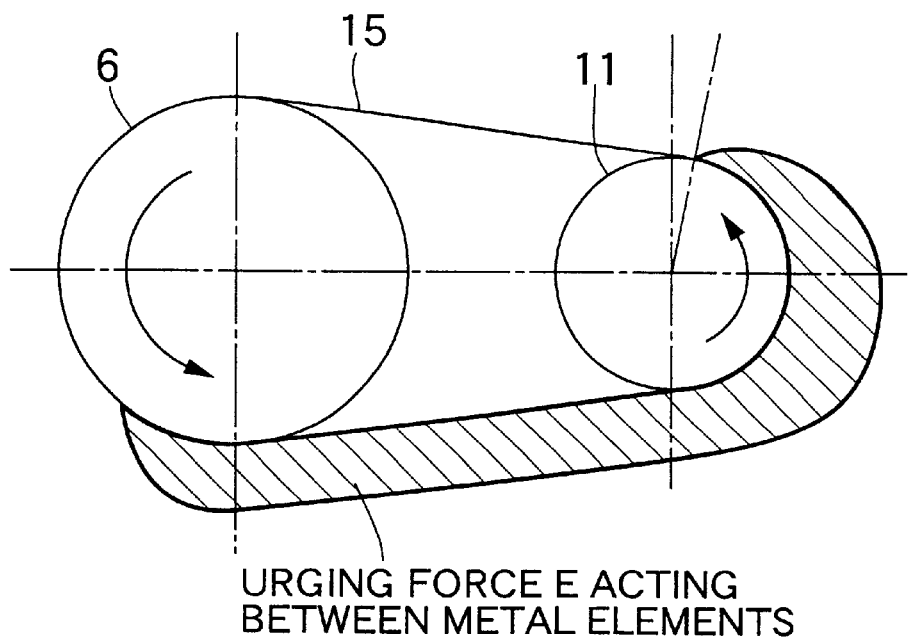
FIG. 4B is a diagram showing the distribution of an urging force acting between the metal elements.

As shown in FIGS. 2 and 3, the metal element 32 formed from a metal plate by pressing and punching includes a substantially trapezoidal element body 34, and a substantially triangular ear portion 36 connected to an upper portion of the element body 34 through a pair of left and right ring slots 35, 35 into which the metal ring assemblies 31, 31 are fitted, respectively. A pair of pulley abutment surfaces 37, 37 are formed on left and right opposite edges of the element body 34 and are capable of being brought into abutment against V-surfaces of the drive pulley 6 and the driven pulley 11. A pair of front and rear main surfaces 38 and 39 extending perpendicular to a direction of movement of the metal element 32 are formed on front and rear sides of the metal element 32 in the direction of movement, and a slope 41 is formed below the main surface 38 which is on the front side in the direction of movement with a laterally extending rocking edge 40 interposed therebetween. Further, a projection 42 and a recess 43 are formed respectively on the main surface 38 on the front side in the direction of movement and the main surface 39 on the rear side in the direction of movement, which correspond to the ear portion 36.

Thus, adjacent ones of the metal elements 32 lying in an advancing-side chord portion extending from the drive pulley 6 toward the driven pulley 11 (i.e., a chord portion capable of transmitting a driving force) transmit the driving force between the elements in a state in which the main surfaces 38 on the front side and the main surface 39 on the rear side are in abutment against each other, and the projection 42 on the front side has been fitted in the recess 43 on the rear side in the adjacent elements. The metal elements 32 wound around the drive pulley 6 and the driven pulley 11 are swung relative to each other by releasing of the contact of the main surfaces 38 and 39 with each other, and are arranged radiately in radial directions of the pulleys 6 and 11.

The inclination of the metal element 32 in a pitching direction will be considered below with reference to FIG. 3. The metal element 32 has the rocking edge 40 provided on a front surface in the direction of movement to permit the inclination of the metal element 32 in the pitching direction. The center 44 of swinging movement of the metal element 32 actually causing the pitching is a widthwise central position of the metal element 32 at the rear of the rocking edge 40. This is because the inclination of the metal element 32 is limited with the ring slot 35 fitted over the metal ring assembly 31 and hence, when the metal element 32 is inclined, the inclination occurs about a position in which a reaction force received from the metal ring assembly 31 is minimum, i.e., about the center 44 of swinging movement.

The tangential friction force acting on the metal element 32 is maximum and the urging force between the metal elements 32 is zero in an outlet portion of the driven pulley 11, as described above. Therefore, the metal element 32 is liable to be inclined to the largest extent in the outlet portion of the driven pulley.

FIG. 3 shows the balance of a force acting on the metal element 32 having a thickness t in the outlet portion of the driven pulley 11. A tangential friction force FV acting on the metal element 32 from the driven pulley 11 acts on a substantially central friction force-acting point 45 of the pulley abutment surface 37 of the metal element 32, and the direction thereof is backward in the direction of movement to inhibit the movement of the metal element 32. If the radius or distance of the center 44 of swinging movement about the axis of the driven pulley 11 is represented by RL, and the radius of the friction force-acting point 45 about the axis of the driven pulley 11 is represented by RV, the distance L between the center 44 of swinging movement and the friction force-acting point 45 is given by RL−RV. Therefore, a counterclockwise moment FV×L is applied to the metal element 32 about the center 44 of swinging movement by the tangential friction force FV. This moment FV×L acts to fall the metal element 32 forwards (in a direction to fall the radially outer end of the metal element 32 forwards).

When the metal element 32 has been inclined forwards, a radially inward load FL is applied from the metal ring assembly 31 to an edge a at a rear end of the ring slot 35. The load FL generates a clockwise moment FL×(t/2) about the center 44 of swinging movement. Therefore, to prevent the inclination of the metal element 32 by the tangential friction force FV, the following relation may be established:

$$FV \times L \leq FL \times (t/2) \quad (1)$$

If this is solved for L/t, the following relation is given:

$$L/t \leq FL/2FV \quad (2)$$

Figure 5:
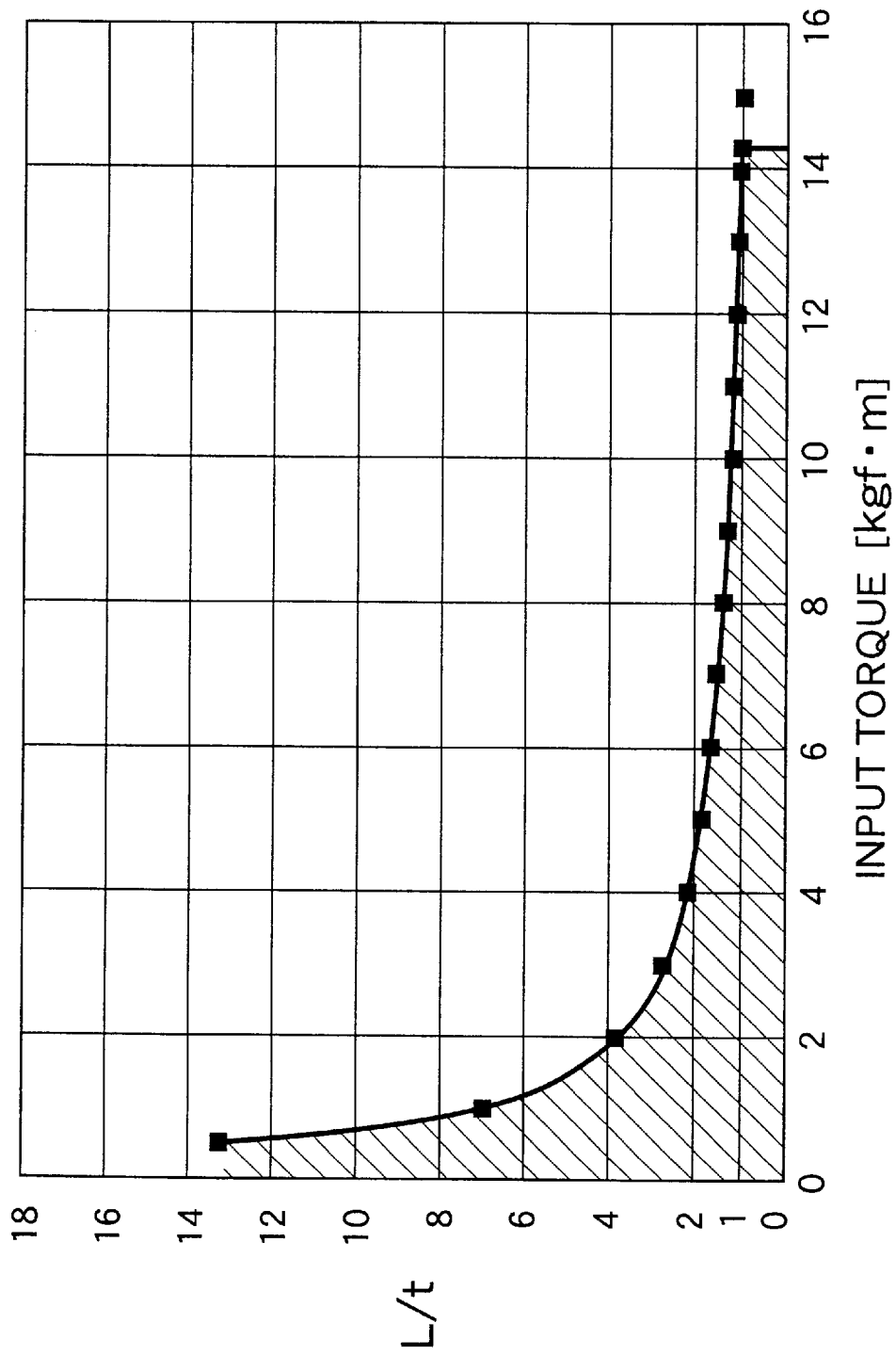

A graph in FIG. 5 shows a region in which the relation (2) is established (a region shown by oblique lines) with respect to various input torques of the metal belt-type continuously variable transmission T. The conditions for the operation of the metal belt-type continuously variable transmission T are an input rotational speed of 6000 rpm, a ratio of 0.61 and a thickness t of the metal element 32 of 1.5 mm.

As can be seen from FIG. 5, the value of L/t is decreased with an increase in input torque, and when the input torque reaches the maximum value of 14.3 kgf·m corresponding to the severest operational condition, FV=10.84 kgf and FL=22.66 kgf are established and hence, FL/2FV=1.05 is established. Thus, if the L/t is set at 1.05 or less in this embodiment, the relation (2) can be established even during the operation at the highest speed which is the severest operational condition to prevent the inclination of the metal element 32.

As a result, it is possible to prevent a local load from being applied between the edge a of the ring slot 35 and the inner periphery of the metal ring assembly 31, and to inhibit the increase in amplitude of a stress inside the innermost metal ring 33, thereby enhancing the durability of the metal ring assembly 31. Moreover, the pulley abutment surface 37 of the metal element 32 can be accurately brought into surface contact with the drive pulley 6 or the driven pulley 11 to avoid the generation of an abnormal wearing, and also the outer periphery of the metal ring assembly 31 can be prevented from interfering with the ear portion 36 of the metal element 32. Thus, it is possible to prevent an increase in amplitude of the stress of the outermost metal ring 33, and to prevent the local load of the innermost metal ring 33 from being increased by a reaction force from the interference. It is unnecessary to provide a special shape in the thickness-wise direction to the saddle surface of the ring slot 35 in the metal element 32 and hence, the metal element 32 can be formed only by pressing, whereby the processing cost for the metal element is reduced.

Figure 6A:
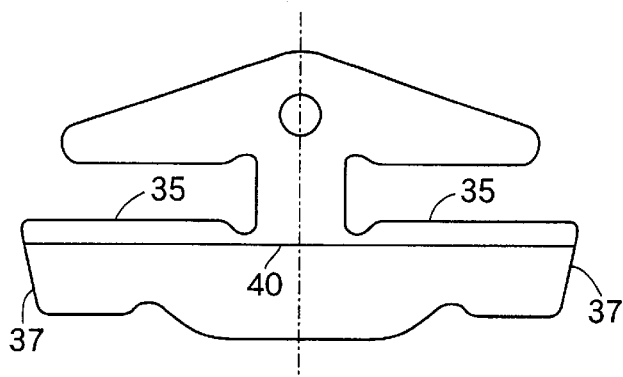
FIGS. 6A and 6B are diagrams showing the shape of the metal element according to an embodiment of the present invention.
Figure 6B:
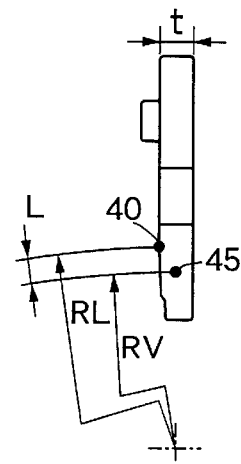
Figure 7A:
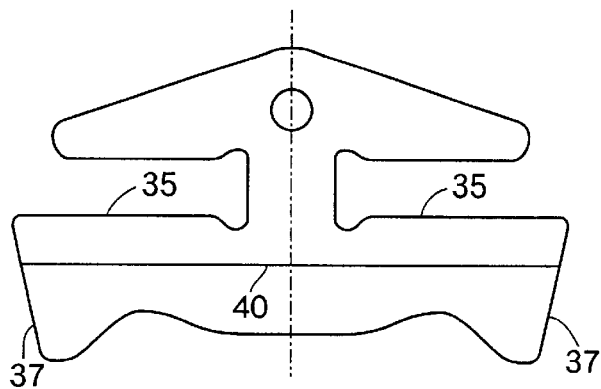
Figure 7B:
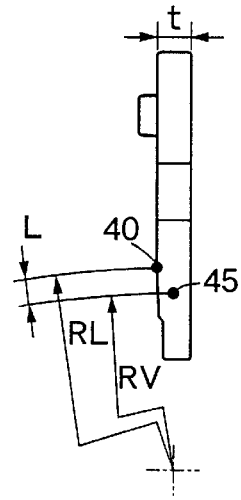
Figure 8A:
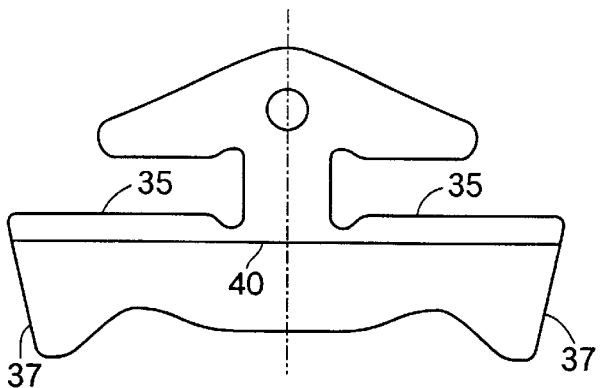
FIGS. 8A and 8B are diagrams showing the shape of a conventional metal element.
Figure 8B:
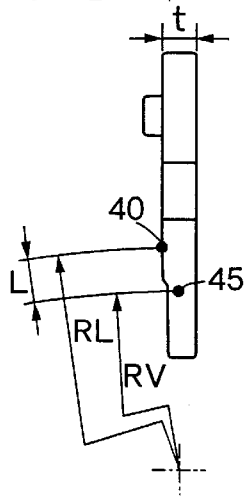

FIGS. 8A and 8B show the shape of a conventional metal element 32. In this metal element 32, because L/t exceeds 1.0, the inclination of the metal element 32 caused by a tangential friction force FV cannot be prevented. In contrast, in the embodiment shown in FIGS. 6A and 6B, the radial dimension of the pulley abutment surface 37 corresponding to that shown in FIGS. 8A and 8B is shortened, and the friction force-acting point 45 is displaced radially outwards, whereby the distance L is shortened to achieve L/t=1.0. In the shape of the metal element 32 shown in FIGS. 7A and 7B, the rocking edge 40 corresponding to that shown in FIGS. 8A and 8B is displaced radially inwards, whereby the distance L is shortened to achieve L/t=1.0.

Although the embodiments of the present invention have been described in detail, it will be understood that various modifications in design may be made without departing from the subject matter of the present invention.

What is claimed is:

1. A belt for a continuously variable transmission, comprising metal ring assemblies (31) each of which is comprised of a plurality of endless metal rings (33) laminated one on another, and a large number of metal elements (32) supported along said metal ring assemblies (31), said belt being wound around a drive pulley (6) and a driven pulley (11) to transmit a driving force, said metal element (32) comprising ring slots (35) into which said metal ring assemblies (31) are fitted, pulley abutment surfaces (37) provided radially inside said ring slots (35) to abut against said drive pulley (6) and said driven pulley (11), a rocking edge (40) which is provided at a radially inner end of a main surface (38) for transmitting an urging force between said metal elements (32) and which serves as a fulcrum for the pitching of said metal elements (32), characterized in that a relation, $L/t \leq FL/2FV$ is established, wherein FV represents a tangential friction force received by said pulley abutment surface (37) from said drive pulley (6) and said driven pulley (11); L represents a radial distance from a point (45) of action of said tangential friction force to the rocking edge (40) located radially outside said friction force-acting point (45); FL represents a radially inward load received by said metal element (32) from said metal ring assemblies (31); and t represents a thickness of said metal element (32).

* * * * *